US012634688B2

(12) United States Patent
Zamora et al.

(10) Patent No.: US 12,634,688 B2
(45) Date of Patent: May 19, 2026

(54) HOME NETWORK INITIATED PRIMARY AUTHENTICATION/REAUTHENTICATION

(71) Applicant: Telefonaktiebolaget LM Ericsson (publ), Stockholm (SE)

(72) Inventors: David Castellanos Zamora, Madrid (ES); Helena Vahidi Mazinani, Lund (SE); Vlasios Tsiatsis, Solna (SE); Jesus Angel De Gregorio Rodriguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 468 days.

(21) Appl. No.: 17/774,177

(22) PCT Filed: Oct. 30, 2020

(86) PCT No.: PCT/EP2020/080529
§ 371 (c)(1),
(2) Date: May 4, 2022

(87) PCT Pub. No.: WO2021/094109
PCT Pub. Date: May 20, 2021

(65) Prior Publication Data
US 2022/0408249 A1 Dec. 22, 2022

(30) Foreign Application Priority Data
Nov. 11, 2019 (EP) ..................................... 19382985

(51) Int. Cl.
*H04W 12/06* (2021.01)
*H04W 12/0431* (2021.01)
(52) U.S. Cl.
CPC ....... *H04W 12/06* (2013.01); *H04W 12/0431* (2021.01)

(58) Field of Classification Search
None
See application file for complete search history.

(56) References Cited

U.S. PATENT DOCUMENTS

2020/0344606 A1* 10/2020 Zaus ........................ H04W 8/18
2021/0120416 A1* 4/2021 S Bykampadi ..... H04L 63/0281
(Continued)

OTHER PUBLICATIONS

"3GPP TS 33.501 V16.0.0 3rd Generation Partnership Project; Technical Specification Group Services and System Aspects; Security architecture and procedures for 5G system (Release 16)" Sep. 2019 (Year: 2019).*
(Continued)

*Primary Examiner* — Philip J Chea
*Assistant Examiner* — James Ross Hollister
(74) *Attorney, Agent, or Firm* — Sage Patent Group

(57) ABSTRACT

Initiating primary reauthentication of a communication device by a home network (UDM or AUSF) is provided. A trigger to initiate a primary reauthentication request of a communication device is detected. An authentication status of the subscription permanent identifier (SUPI) of the communication device is checked. Responsive to the authentication status of the SUPI being obsolete or null, a reauthentication message is transmitted towards an access and mobility management function (AMF) node. A reauthentication confirmation message is received. A determination is made as to whether to continue, abort, or postpone any steering of roaming (SoR) updates, any user equipment parameter updates (UPU updates) or any authentication and key agreement for applications (AKMA) procedures based on the reauthentication confirmation message.

20 Claims, 8 Drawing Sheets

(56) References Cited

U.S. PATENT DOCUMENTS

2022/0167157 A1*   5/2022   Tiwari .................. H04L 9/3242
2024/0155342 A1*   5/2024   Faccin ............... H04W 12/082

OTHER PUBLICATIONS

International Search Report and Written Opinion of the International Searching Authority, PCT/EP2020/080529, mailed Dec. 22, 2020, 13 pages.
3GPP TS 33.501 V16.0.0, "3rd Generation Partnership Project; Technical Specification Group Services and System Aspects; Security architecture and procedures for 5G system (Release 16)," Valbonne, France, Sep. 2019, 196 pages.
3GPP TSG-SA WG3 Meeting #94Ad-Hoc, "Solution to support Fast Re-authentication in 5GS," NEC, Intel, S3-190634, Stockholm, Sweden, Mar. 11-15, 2019, 5 pages.
3GPP TSG-SA WG3 Meeting #95, "UDM triggered authentication," NEC, S3-191208, Reno, USA, May 6-10, 2019, 3 pages.
3GPP TS 23.502 V16.2.0, "3rd Generation Partnership Project; Technical Specification Group Services and System Aspects; Procedures for the 5G System (5GS); Stage 2 (Release 16)," Valbonne, France, Sep. 2019, 525 pages.
3GPP TR 33.835 V1.0.1, "3rd Generation Partnership Project; Technical Specification Group Services and System Aspects; Study on authentication and key management for applications based on 3GPP credential in 5G (Release 16)," Valbonne, France, Sep. 2019, 92 pages.
3GPP TS 23.122 V16.3.0, "3rd Generation Partnership Project; Technical Specification Group Core Network and Terminals; Non-Access-Stratum (NAS) functions related to Mobile Station (MS) in idle mode (Release 16)," Valbonne, France, Sep. 2019, 75 pages.
3GPP TS 29.503 V16.1.0, "3rd Generation Partnership Project; Technical Specification Group Core Network and Terminals; 5G System; Unified Data Management Services; Stage 3 (Release 16)," Valbonne, France, Sep. 2019, 234 pages.

* cited by examiner

HOME NETWORK INITIATED PRIMARY AUTHENTICATION/REAUTHENTICATION

CROSS REFERENCE TO RELATED APPLICATIONS

This application is a 35 U.S.C. § 371 national stage application of PCT International Application No. PCT/EP2020/080529 filed on Oct. 30, 2020, which claims priority to EP 19382985.0, filed on Nov. 11, 2019, the disclosures and contents of which are incorporated by reference herein in their entireties.

TECHNICAL FIELD

The present disclosure relates generally to communications, and more particularly to communication methods and related devices and nodes supporting wireless communications.

BACKGROUND

3GPP TS 33.501 [1], clause 6.1.4, specifies that the result of the primary authentication will be stored by the unified data management, UDM, and that this information can be used to link authentication confirmation to the subsequent procedures, in order to prevent certain types of fraud, e.g. fraudulent Nudm_UECM_Registration Request (i.e. a UDM Service based interface UE Context Management Registration Request) for registering the subscriber's serving Access and Mobility Management Function, AMF, in UDM while the subscriber is not actually present in the visited network.

Corresponding stage 3-specification 3GPP TS 29.503 [2] defines specific REAUTHENTICATION_REQUIRED error code for Nudm_UECM services to indicate that "due to operator policies the user needs to be re-authenticated, e.g. last valid authentication is considered obsolete". Upon reception of this error, the AMF is expected to trigger a primary (re-) authentication procedure for the communication device (e.g., UE). After successful authentication, the AMF may retry the Nudm_UECM service again.

SUMMARY

According to some embodiments of inventive concepts, a method performed by a processor in a unified data management, UDM, node of a communication network to initiate primary reauthentication of a communication device is provided. The method includes detecting a trigger to initiate a primary reauthentication request. The method further includes checking an authentication status of the Subscription Permanent Identifier, SUPI, of the communication device. The method further includes responsive to the authentication status of the SUPI being obsolete or null, transmitting a primary reauthentication message towards an Access and Mobility Management Function, AMF, via an authentication server function, AUSF. The method further includes receiving a reauthentication confirmation message from the AUSF. The method further includes determining whether to continue, abort, or postpone any steering of roaming, SoR, updates, any user equipment parameter updates, UPUs, or any authentication and key agreement for applications, AKMA, procedures based on the reauthentication confirmation message.

Corresponding embodiments of inventive concepts for UDM devices, computer products, and computer programs are also provided.

An advantage provided by the inventive concepts is that the home network is able to link the authentication status of a given SUPI to procedures initiated by the home network towards the AMF/communication device. The enables home network-initiated procedures to be completed successfully (when reauthentication is successful), postponed, or cancelled (when the home network initiated reauthentication cannot be completed or is unsuccessful).

According to other embodiments of inventive concepts, a method performed by a processor in an authentication server function, AUSF, node of a communication network to initiate primary reauthentication of a communication device is provided. The method includes detecting a trigger to initiate the primary reauthentication of the communication device. The method further includes checking with a unified data management, UDM, node to determine which access and mobility management function, AMF, to send a primary reauthentication message. The method further includes transmitting the primary reauthentication message to the AMF. The method further includes receiving a reauthentication confirmation message from the AMF. The method further includes transmitting a reauthentication result confirmation message to the UDM node.

Corresponding embodiments of inventive concepts for AUSF nodes, computer products, and computer programs are also provided.

According to yet other embodiments of inventive concepts, a method performed by a processor in an access and mobility management function, AMF, node of a communication network is provided. The method includes receiving a primary reauthentication message from an authentication server function, AUSF, node the primary reauthentication message including a request for reauthenticating a specified communication device. The method further includes initiating a primary reauthentication procedure with the specified communication device. The method further includes determining a result of the primary reauthentication procedure, the result indicating whether the primary reauthentication procedure was successful or unsuccessful. The method further includes transmitting a reauthentication confirmation message to the AUSF node, the reauthentication confirmation message including the result of the primary reauthentication procedure.

Corresponding embodiments of inventive concepts for AMF nodes, computer products, and computer programs are also provided.

The problem addressed by the inventive concepts is that the defined error indication (e.g. last valid authentication is considered obsolete) from the home network to the AMF is only available in response service operations initiated by the AMF. The inventive concepts provide a mechanism for the home network (e.g., the UDM or the AUSF) to initiate a primary authentication or reauthentication procedure.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
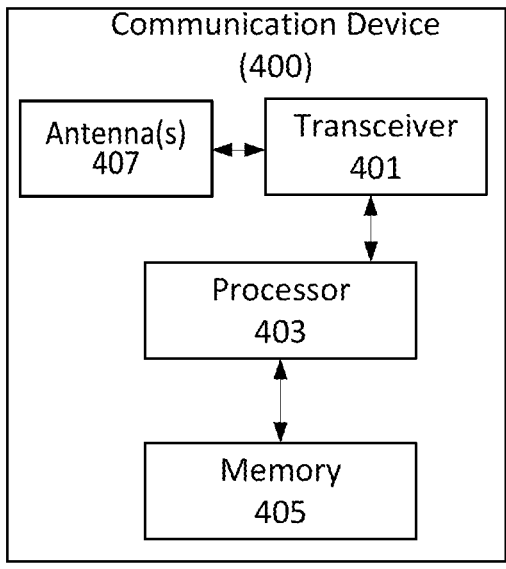
FIG. 4 is a block diagram illustrating a communication device according to some embodiments of inventive concepts.

FIG. 4 is a block diagram illustrating elements of a communication device 400 (also referred to as a mobile terminal, a mobile communication terminal, a wireless communication device, a wireless terminal, mobile device, a wireless communication terminal, user equipment, UE, a user equipment node/terminal/device, etc.) configured to provide communication according to embodiments of inventive concepts. As shown, communication device 400 may include an antenna 407, and transceiver circuitry 401 (also referred to as a transceiver) including a transmitter and a receiver configured to provide uplink and downlink radio communications with a base station(s) (also referred to as a RAN—node of a radio access network. The communication device 400 may also include processing circuitry 403 (also referred to as a processor) coupled to the transceiver circuitry, and memory circuitry 405 (also referred to as memory) coupled to the processing circuitry. The memory circuitry 405 may include computer readable program code that when executed by the processing circuitry 403 causes the processing circuitry to perform operations disclosed herein. According to other embodiments, processing circuitry 403 may be defined to include memory so that separate memory circuitry is not required. The communication device 400 may also include an interface (such as a user interface) coupled with processing circuitry 403, and/or the communication device 300 may be incorporated in a vehicle.

As discussed herein, operations of communication device 400 may be performed by processing circuitry 403 and/or transceiver circuitry 401. For example, processing circuitry 403 may control transceiver circuitry 401 to transmit communications through transceiver circuitry 401 over a radio interface to an Access and Mobility Management Function (AMF) node (also referred to as a base station) and/or to receive communications through transceiver circuitry 401 from an AMF node over a radio interface. Moreover, modules may be stored in memory circuitry 405, and these modules may provide instructions so that when instructions of a module are executed by processing circuitry 403, processing circuitry 403 performs respective operations described below.

Figure 5:
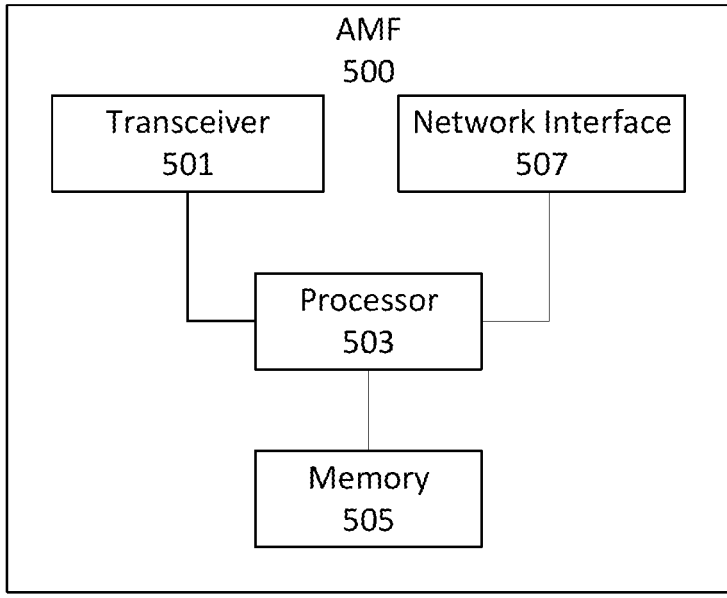
FIG. 5 is a block diagram illustrating an access and mobility management function (AMF) node according to some embodiments of inventive concepts.

FIG. 5 is a block diagram illustrating elements of an AMF node 400 (which in some embodiments is integrated into a network node, base station, eNodeB/eNB, gNodeB/gNB, etc.) of a Radio Access Network (RAN) configured to provide cellular communication according to embodiments of inventive concepts. In other embodiments, the functions of the AMF node 400 may be implemented in a distributed manner across several nodes in a network. As shown, the AMF node may include transceiver circuitry 501 including a transmitter and a receiver configured to provide uplink and downlink radio communications with mobile terminals. The AMF node may include network interface circuitry 507 configured to provide communications with other nodes (e.g., with other base stations) of the RAN and/or core network CN. The AMF node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the AMF node may be performed by processing circuitry 503, network interface 507, and/or transceiver 501. For example, processing circuitry 503 may control transceiver 501 to transmit downlink communications through transceiver 501 over a radio interface to one or more communication devices and/or to receive uplink communications through transceiver 501 from one or more communication devices over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to AMF operations).

Figure 6:
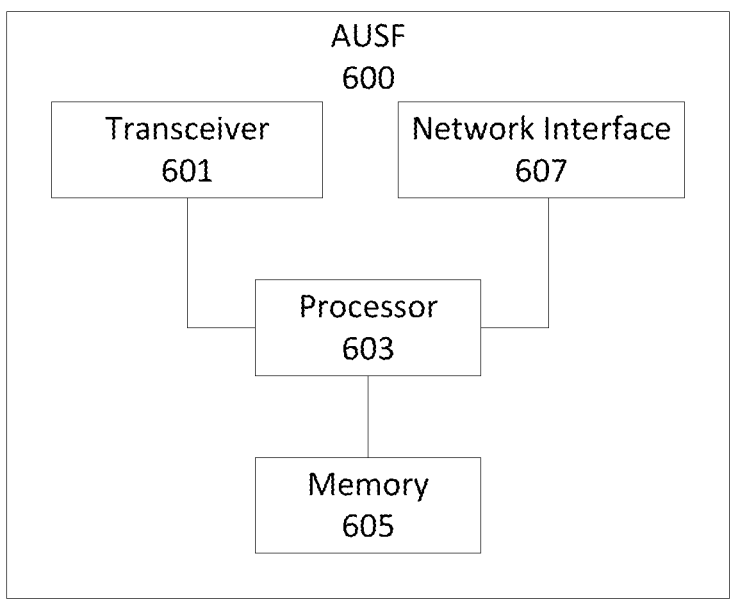
FIG. 6 is a block diagram illustrating an authentication server function (AUSF) node according to some embodiments of inventive concepts.

FIG. 6 is a block diagram illustrating elements of an authentication server function (AUSF) node 600 of a communication network configured to provide authentication services according to embodiments of inventive concepts. In some embodiments, the functions of the AUSF node 600 may be implemented in a distributed manner across several nodes in a network or be integrated into another network node. As shown, the AUSF node may include network interface circuitry 607 (also referred to as a network interface) configured to provide communications with other nodes of the core network, CN, and/or the radio access network, RAN. The AUSF node 607 may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein.

According to other embodiments, processing circuitry 603 may be defined to include memory so that a separate memory circuitry is not required. The AUSF node 600 may further include a transceiver 601.

As discussed herein, operations of the AUSF node may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to AUSF operations).

Figure 7:
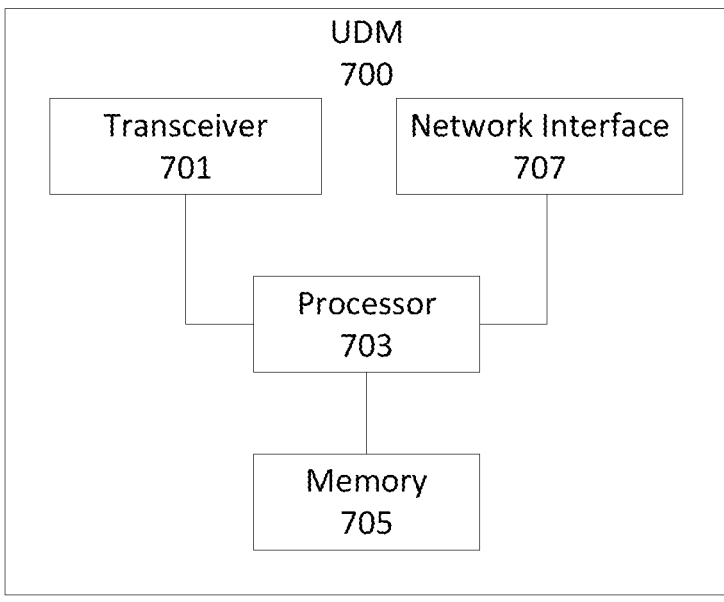
FIG. 7 is a block diagram illustrating a unified data management, UDM, node according to some embodiments of inventive concepts.

FIG. 7 is a block diagram illustrating elements of an unified data management (UDM) node 700 of a communication network configured to provide services according to embodiments of inventive concepts. In some embodiments, the functions of the DUM node 700 may be implemented in a distributed manner across several nodes in a network or be integrated into another network node. As shown, the UDM node may include network interface circuitry 707 (also referred to as a network interface) configured to provide communications with other nodes of the core network and/or the radio access network RAN. The UDM node 700 may also include a processing circuitry 703 (also referred to as a processor) coupled to the network interface circuitry, and memory circuitry 705 (also referred to as memory) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required. The UDM node 700 may further include a transceiver 701.

As discussed herein, operations of the UDM node may be performed by processing circuitry 703 and/or network interface circuitry 707. For example, processing circuitry 703 may control network interface circuitry 707 to transmit communications through network interface circuitry 707 to one or more other network nodes and/or to receive communications through network interface circuitry from one or more other network nodes. Moreover, modules may be stored in memory 705, and these modules may provide instructions so that when instructions of a module are executed by processing circuitry 703, processing circuitry 703 performs respective operations (e.g., operations discussed below with respect to Example Embodiments relating to UDM operations).

As previously indicated, the corresponding stage 3 specification TS 29.503 [2] defines specific REAUTHENTICATION_REQUIRED error code for Nudm_UECM services to indicate that "due to operator policies the user needs to be re-authenticated, e.g. last valid authentication is considered obsolete". Upon reception of this error, the AMF is expected to trigger a primary (re-) authentication procedure for the UE. After successful authentication, the AMF retry the Nudm_UECM service again.

However, the defined error indication from the home network (HN) to the AMF is only available in response to service operations initiated by the AMF. There is no mechanism for the HN to initiate a primary authentication or re-authentication procedure.

A HN initiated primary authentication or reauthentication procedure maybe useful in situations when the HN is required to initiate interactions with the serving network (SN) or the communication device itself without any previous request from the communication device/AMF. For example, the update of Steering of Roaming (SoR) information as defined in TS 23.122 [3] (Annex C.3), or the update of other communication device parameters via the UE parameter update (UPU) procedure as defined in TS 23.502, [4] section 4.20, or Authentication and Key Agreement for Applications, AKMA, procedures currently under definition in Rel-16 study document TR 33.835 [5], make use of the $K_{AUSF}$ key generated during primary authentication. However, when the last valid authentication of the communication device is considered to be obsolete by the HN, the corresponding $K_{AUSF}$ should be also considered obsolete and not be used any further e.g. for SoR, UPU and/or AKMA purposes.

The use of an obsolete $K_{AUSF}$ may imply that the corresponding SoR, UPU or AKMA procedure is unsuccessful as the communication device may not store any longer the obsolete $K_{AUSF}$. Otherwise, if the obsolete $K_{AUSF}$ is not used, the corresponding SoR, UPU or AKMA procedure shall be rejected or postponed until the system (initiated by the communication device/AMF) generates a new fresh $K_{AUSF}$.

The advantages of the inventive concepts described herein enable the HN to be able to link the authentication status of a given Subscription Permanent Identifier (SUPI) not only to AMF initiated procedures but also to procedures initiated by the HN towards the AMF/communication device.

Furthermore, the inventive concepts in some embodiments provide a mechanism for the HN to initiate a primary (re-)authentication procedure in the case that HN initiated procedures require the establishment of a new/fresh security association with the communication device.

In this way, the HN initiated procedures can be completed successfully (in case the HN initiated primary authentication is successful), postponed or cancelled (in case the HN initiated primary authentication cannot be completed or is unsuccessful).

The mechanism for the HN to initiate a primary (re-) authentication procedure for a given UE is based on the knowledge at the UDM about the authentication status for a given UE via the Nudm_UEAuthentication_ResultConfirmation service operation defined in clause 6.1.4.1a of TS 33.501 [1].

Figure 1:
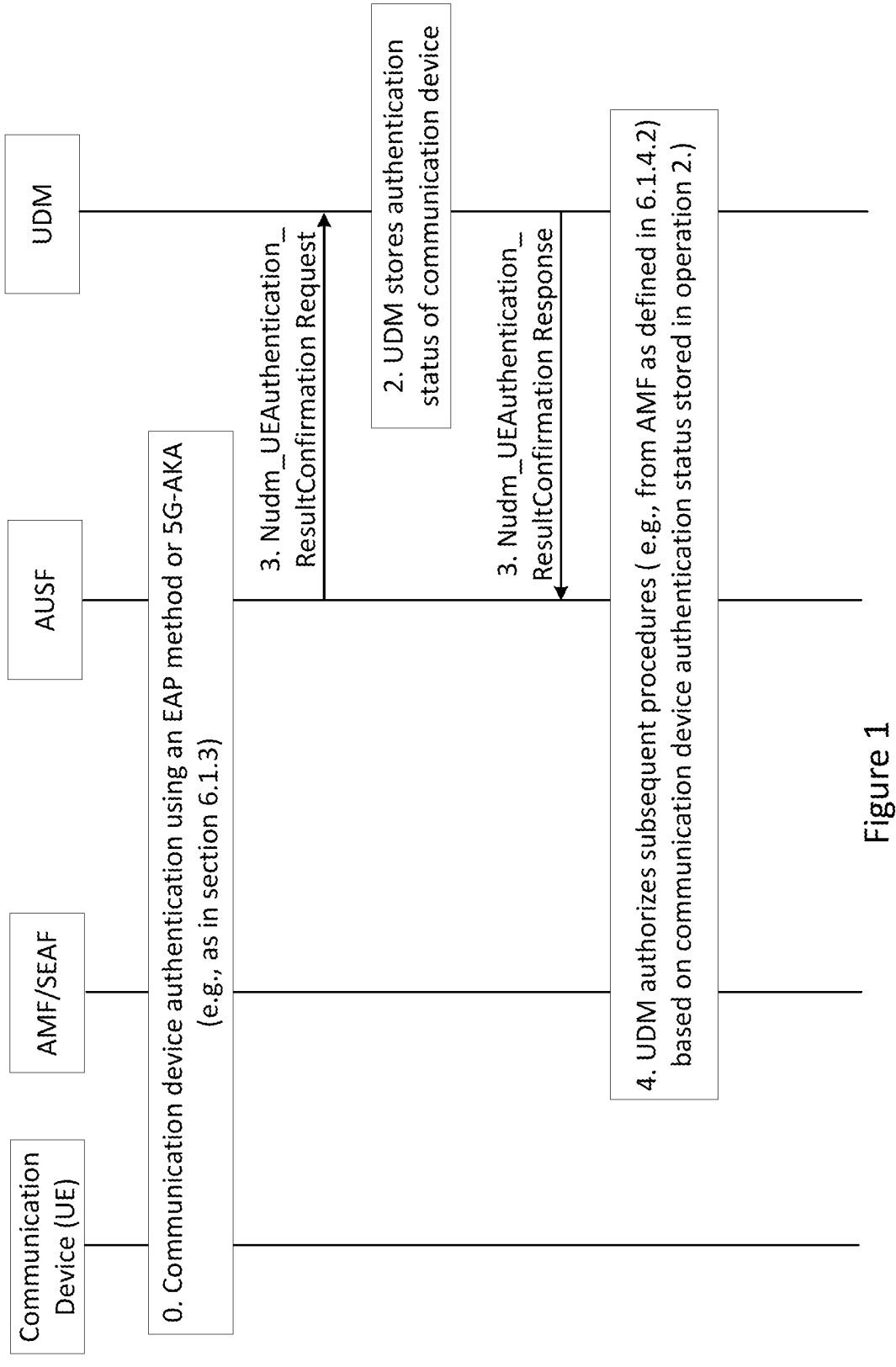
FIG. 1 is a signaling diagram illustrating increased home control to subsequent procedures according to some embodiments.

FIG. 1 is based on FIG. 6.1.4.1.*a*-1 of said TS 33.501. In operation 1 of FIG. 1, the AUSF can inform the UDM about the result and time of an authentication procedure with a communication device using a Nudm_UEAuthentication-_ResultConfirmation Request. This request shall include the subscription permanent identifier (SUPI), a timestamp of the authentication, the authentication type (e.g. EAP method or 5G-AKA), and the serving network name. In operation 2, the UDM stores the authentication status of the communication device (e.g., the SUPI, authentication result, timestamp, and the serving network name). In operation 3, the UDM replies to the AUSF with a Nudm_UEAuthentication_ResultConfirmation Response. In operation 4, UDM can authorize subsequent procedures initiated by the AMF based on the authentication status stored in step 2. In step 2, the AUSF ID is also stored in UDM together with the authentication status.

In accordance with some inventive concepts, the home network control of subsequent procedures (e.g., operation 4 of FIG. 1) may be improved by extending the linking of the authentication status to HN initiated procedures (e.g. SoR, UPU, AKMA). This enables the HN initiated procedures to progress successfully using a fresh security association with the communication device by defining a HN initiated primary authentication and primary re-authentication procedure (by the UDM or the AUSF) for a given communication device.

The HN initiated primary authentication/re-authentication procedure in one embodiment is triggered by the UDM based on the authentication status of the communication device stored in step 2 of FIG. 1 together with other information (e.g. HPLMN configuration, communication device profile information). The UDM initiates a request to the AMF to initiate a primary authentication procedure for a given communication via the AUSF.

Figure 2:
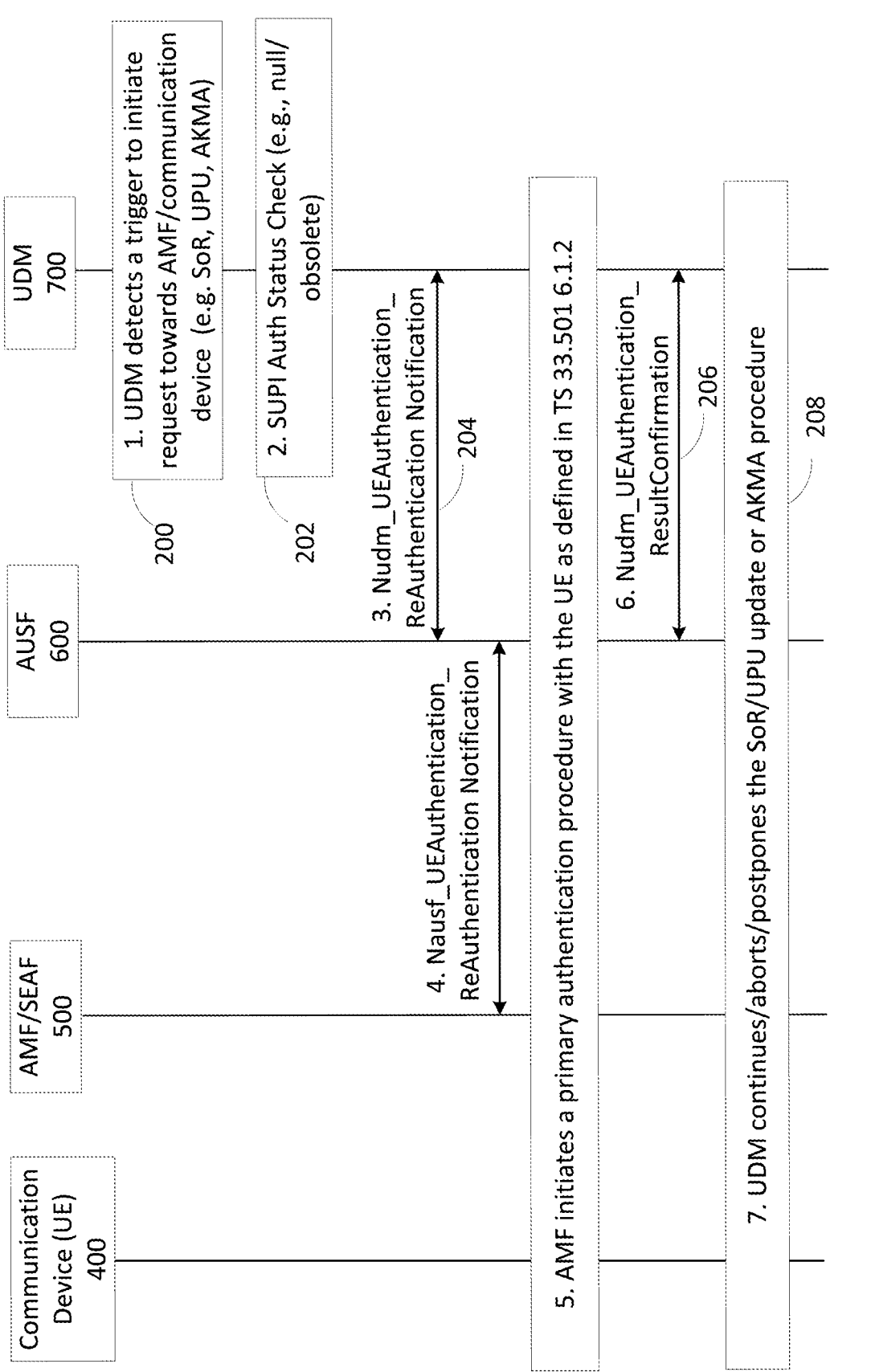
FIG. 2 is a signaling diagram illustrating home network initiated primary reauthentication procedures according to some embodiments of inventive concepts.

Turning to FIG. 2, operations the UDM processing circuitry 703 perform and operations other nodes perform are illustrated in the HN initiated primary authentication/re-authentication procedure triggered by the UDM 700. In operation 200, the processing circuitry 703 may detect a trigger to initiate an authentication/re-authentication request for the communication device. For example, the processing circuitry 703 may detect the need to initiate a signalling procedure towards the AMF 500 or communication device 400. The need to initiate the signalling procedure may be for example, based on a request from a NEF to update subscription data which will need to be notified to the AMF as defined in TS 23.502, [4] section 4.15.6, based on an update of SoR information as defined in TS 23.122 [3] (Annex C.3), or other UE Parameters which will need to be updated in the UE/UICC accordingly via the AMF 500 as defined in TS 23.502, [4] section 4.20, or a request related to the AKMA procedures currently under definition in TR 33.835 [5].

In operation 202, the UDM may check the authentication status of the SUPI before continuing with the corresponding signalling procedure. For example, responsive to the authentication status of the SUPI being considered to be obsolete or not available, the processing circuitry 703 may trigger a HN initiated primary authentication/re-authentication procedure for the communication device 400. Similarly, if the communication device 300 is not registered in the 5G Core, 5GC, via an AMF registered in the UDM and based also on e.g. HPLMN configuration and/or other communication device profile information, the UDM may trigger a HN initiated primary authentication/re-authentication procedure for the communication device.

In operation 204, the processing circuitry 703 may transmit a re-authentication notification to the AUSF 600 using a Nudm_UEAuthentication_ReAuthentication Notification.

In another embodiment, the processing circuitry 703 may transmit a re-authentication request to the AUSF 600.

The processing circuitry 703 may select the AUSF 600 instance used during the latest primary authentication stored in the Authentication Status for the SUPI (received within a previous Nudm_UEAuthentication_ResultConfirmation Request). In this case, the AUSF may also subscribe to be notified of the need for HN initiated re-authentication and may provide a Callback URI to receive Nudm_UEAuthentication_ReAuthentication Notifications.

In one embodiment where the AUSF 600 is deployed as a stateless function, the processing circuitry 703 may select any other AUSF instance available for the SUPI. In this case, all AUSF instances are subscribed to receive Nudm_UEAuthentication_ReAuthenticate notifications.

The Nudm_UEAuthentication_ReAuthentication Notification includes the AMF ID of the AMF 500 registered in the UDM and via which the communication device 400 is registered in the 5GC. Alternatively, the UDM may include a Callback URI to send the Nausf_UEAuthentication_ReAuthentication Notification to the AUSF 600 if provided by the AMF during AMF registration in UDM.

The AUSF 600 in operation 4 forwards the re-authentication notification to the AMF 500 using a Nausf_UEAuthentication_ReAuthentication Notification. The AUSF 600 selects the AMF instance indicated by the UDM.

The AMF 500 in operation 5 initiates a primary authentication procedure as defined in TS 33.501 [1] (section 6.1.2). In this case, the AMF may need to page/contact the UE before initiating this procedure.

The AUSF 600 in operation 6 informs the UDM 700 about the result of the primary authentication procedure (successful or unsuccessful) via Nudm_UEAuthentication_ResultConfirmation service operation. Thus, in operation 206, the processing circuitry 703 receives the result of the primary authentication procedure (successful or unsuccessful) via the Nudm_UEAuthentication_ResultConfirmation.

Based on the result of the HN initiated primary (re-) authentication procedure, the processing circuitry 703 continues, aborts or postpones the HN initiated procedure (e.g. SoR/UPU Update, AKMA, etc.).

Figure 3:
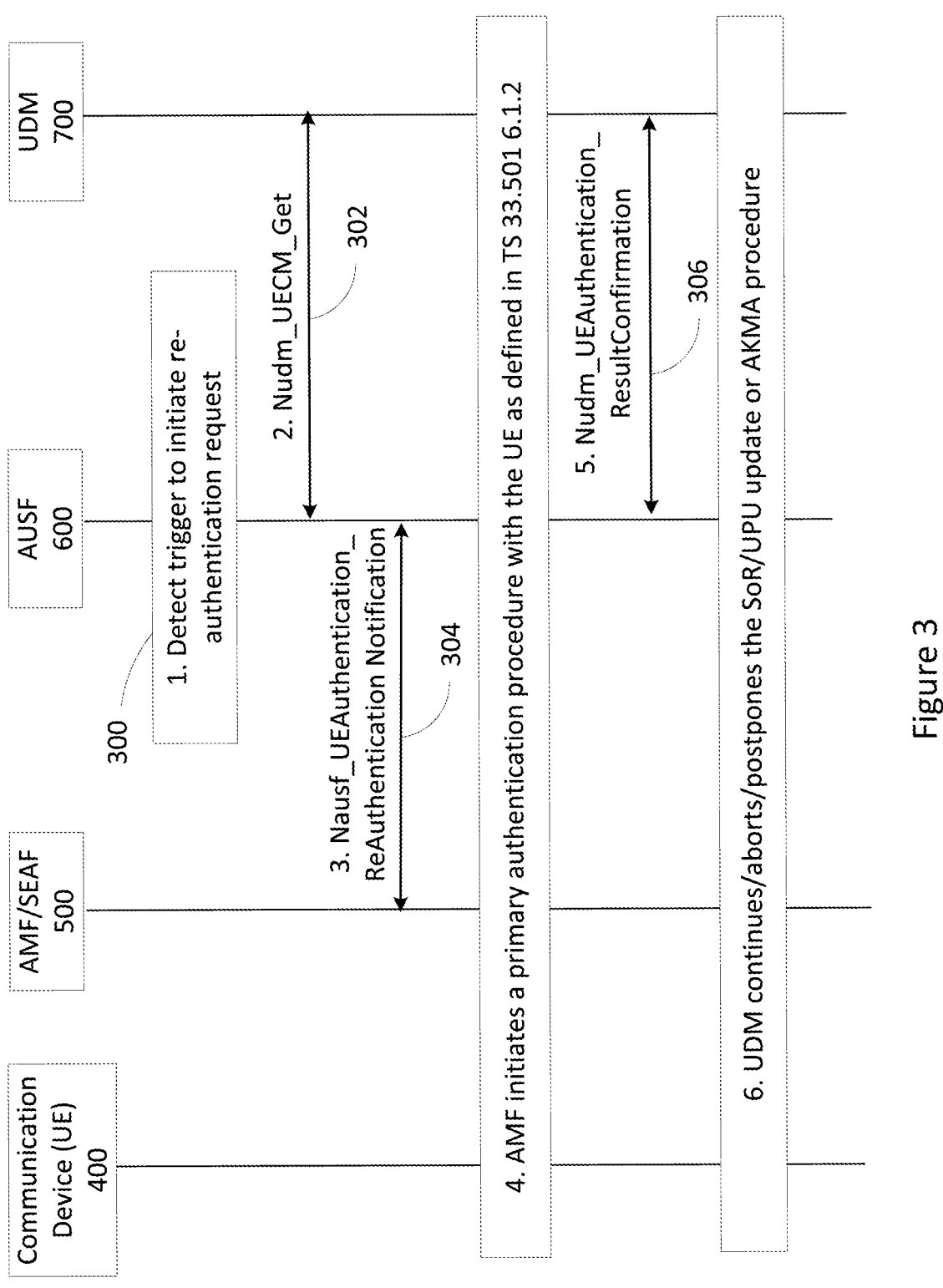
FIG. 3 is a signaling diagram illustrating home network initiated primary reauthentication procedures according to some other embodiments of inventive concepts.

Turning to FIG. 3, in another embodiment of inventive concepts, the AUSF 600 detects when to initiate an authentication/re-authentication procedure. In operation 300, the processing circuitry 603 of AUSF 600 detects a trigger to initiate primary re-authentication of the communication device 400. The trigger may be a message from the UDM such as a change in authentication status of the communication device, from an AKMA procedure, etc. In operation 302, the processing circuitry 304 checks with the UDM where to send the request to (i.e. to which AMF). Thus, the processing circuitry 304 may check with the UDM to determine which AMF to send a primary reauthentication message.

In operation 304, the processing circuitry 603 initiates a HN initiated primary authentication/re-authentication procedure for the communication device 400. Thus, the processing circuitry 603 may transmit a Nausf_UEAuthentication_ReAuthentication Notification to the AMF 500.

The AMF 500 in operation 4 initiates a primary authentication procedure as defined in TS 33.501, [1] section 6.1.2. In this case, the AMF may need to page/contact the UE before initiating this procedure.

The processing circuitry 603 informs the UDM 700 about the result of the primary authentication procedure (successful or unsuccessful) in operation 306 via transmission of the Nudm_UEAuthentication_ResultConfirmation service operation.

Based on the result of the HN initiated primary (re-) authentication procedure, the UDM 700 continues, aborts or postpones the HN initiated procedure (e.g. SoR/UPU Update, AKMA, etc.).

Figure 8:
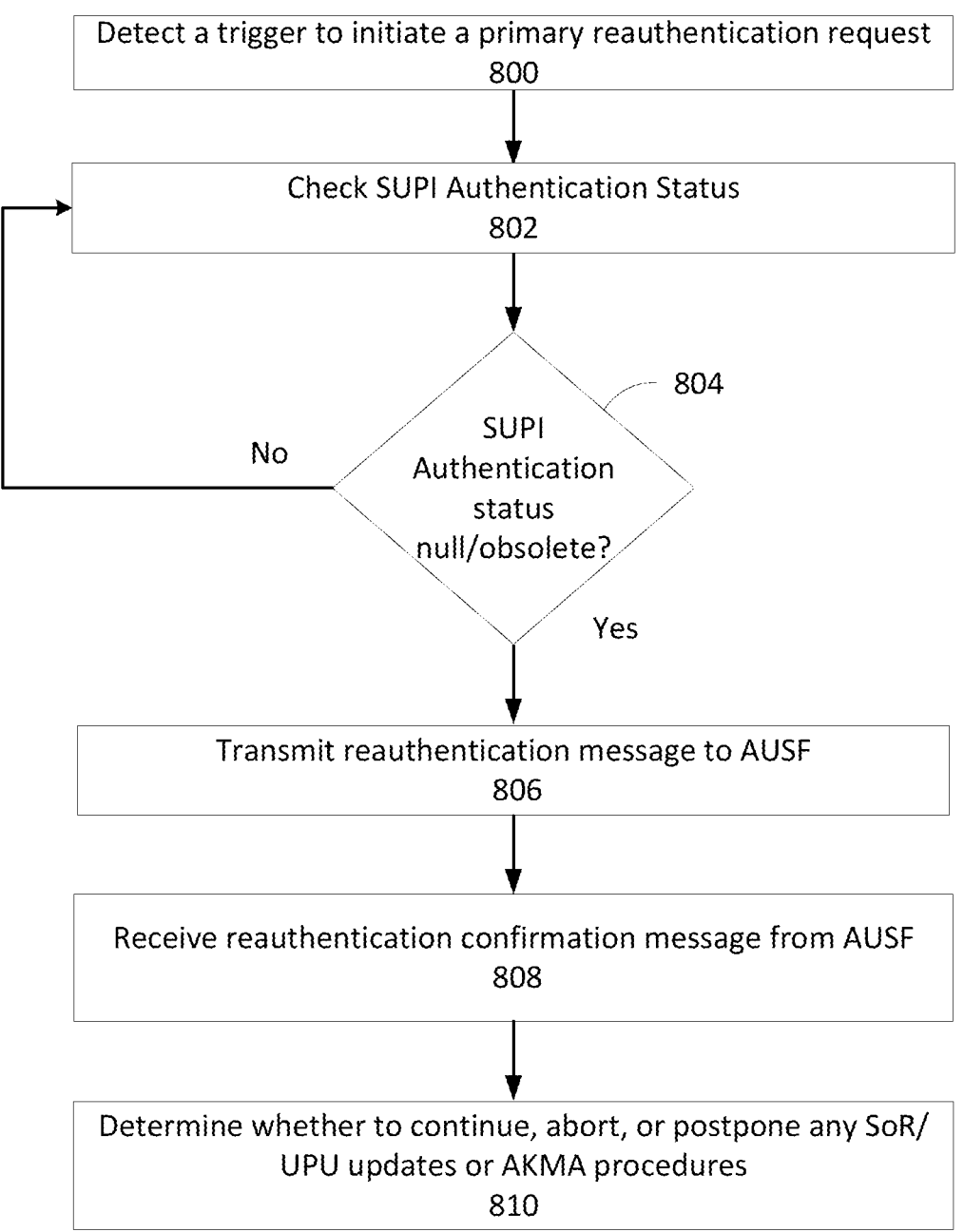
FIG. 8 is a flow chart illustrating operations of a UDM node according to some embodiments of inventive concepts.

Now that the operations that the various components have been described, operations specific to the UDM 700 (implemented using the structure of the block diagram of FIG. 7) will now be discussed with reference to the flow chart of FIG. 8 according to some embodiments of inventive concepts. For example, modules may be stored in memory 705 of FIG. 7, and these modules may provide instructions so that when the instructions of a module are executed by respective UDM processing circuitry 703, processing circuitry 703 performs respective operations of the flow chart.

In block 800, the processing circuitry 703 may detect a trigger to initiate a primary reauthentication request of a communication device. Block 800 is similar to operation 200 of FIG. 2. Thus, the need to initiate the signalling procedure may be for example, based on a request from a NEF to update subscription data which will need to be notified to the AMF as defined in TS 23.502 [4] (section 4.15.6), based on an update of SoR information as defined in TS 23.122 [3] (Annex C.3), or other UE Parameters which will need to be updated in the UE/UICC accordingly via the AMF 500 as defined in TS 23.502 [4] (section 4.20), or a request related to the AKMA procedures currently under definition in the study document TR 33.835 [5].

In block 802, the processing circuitry 703 may check the authentication status of the SUPI of the communication device. The operations performed in block 802 are similar to the operations performed in operation 202 of FIG. 2. For example, the authentication status of the SUPI may indicate the authentication of the communication device is considered to be valid, obsolete or not available.

In block 804, the processing circuitry 703 may determine whether the authentication status of the SUPI is obsolete or missing (e.g., null). If the authentication status of the SUPI is not obsolete or not missing, the processing circuitry does not transmit any reauthentication messages to the AUSF. Instead the processing circuitry 703 may periodically recheck the authentication status of the SUPI, wait for detection of another trigger, etc.

Responsive to the authentication status of the SUPI being obsolete or null, the processing circuitry 703 may transmit a primary reauthentication message towards the AMF via an AUSF 600 in block 806. The operations performed in block 806 may be the same or similar to the operations performed in operation 204 of FIG. 2. Thus, the processing circuitry 703 may transmit a primary re-authentication notification to the AUSF 600 using a Nudm_UEAuthentication_ReAuthentication Notification. In another embodiment, the processing circuitry 703 may transmit a primary re-authentication request to the AUSF 600. In transmitting the primary reauthentication message, the processing circuitry 703 may identify an AMF node registered in the UDM node via which the communication device registered to access the communication network. The processing circuitry 703 may include the identification of the AMF node identified in the reauthentication message. In a further embodiment, the processing circuitry 703 may, responsive to the URI being provided by the AMF during AMF registration in the UDM, transmit the primary reauthentication message with the URI.

In block 808, the processing circuitry 703 may receive a reauthentication confirmation message from the AUSF 600.

The operations performed in block 808 may be the same or similar to the operations performed in operation 206 of FIG. 2. Thus, the processing circuitry 703 may receive the result of the primary authentication procedure (successful or unsuccessful) via the Nudm_UEAuthentication_ResultConfirmation.

In block 810, the processing circuitry 703 may determine whether to continue, abort, or postpone any steering of roaming, SoR, updates, any user equipment parameter updates, UPUs, or any AKMA procedures based on the reauthentication confirmation message. The operations performed in block 801 may be the same or similar to the operations performed in operation 208 of FIG. 2.

Operations of an AUSF node 600 (implemented using the structure of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective AUSF node processing circuitry 603, processing circuitry 603 performs respective operations of the flow chart.

In block 900, the processing circuitry 603 may detect a trigger to initiate a primary reauthentication request of a communication device. For example, the UDM node 7000 or another node may transmit a trigger to the AUSF node 600 for an update of SoR information, an update of UPU, a receipt of a request related to AKMA procedures, etc.

In block 902, the processing circuitry 603 may check with the UDM to determine which AMF to send the primary reauthentication message. In block 904, the processing circuitry may determine whether the communication device is registered with the UDM.

In block 906, when the communication device is registered with the UDM, the processing circuitry 603 may transmit a primary reauthentication message to an AMF 500. In transmitting the reauthentication message to the AMF, the processing circuitry 603 may select an AMF indicated by the UDM and transmit the reauthentication message to the AMF indicated by the UDM. In transmitting the reauthentication message to the AMF, the processing circuitry 603 may transmit a reauthentication notification to the AMF. In another embodiment, in transmitting the reauthentication message to the AMF, the processing circuitry 603 may transmit a reauthentication request message to the AMF.

In block 908, the processing circuitry 603 may receive a reauthentication confirmation message from the AMF. The reauthentication confirmation message may indicate success or failure of the reauthentication of the communication device. In receiving the reauthentication confirmation message, the processing circuitry 603 may receive a reauthentication confirmation notification from the AMF. In another embodiment, in receiving the reauthentication confirmation message, the processing circuitry 603 may receive a reauthentication confirmation response message from the AMF.

In block 910, the processing circuitry 603 may transmit a reauthentication result confirmation message to the UDM. The reauthentication result confirmation message may indicate success or failure of the reauthentication of the communication device. In transmitting the reauthentication result confirmation message, the processing circuitry 603 may transmit a reauthentication result confirmation notification to the UMD. In another embodiment, in transmitting the reauthentication result confirmation message, the processing circuitry 603 may transmit a reauthentication result confirmation response message to the UDM.

In block 912, the processing circuitry 603 may store authentication information for the communication device. For example, the K$_{AUSF}$ key may be stored. The processing circuitry may delete authentication information from a previous authentication procedure for the communication device as part of the operations of storing the authentication information for the communication device.

Figure 9:
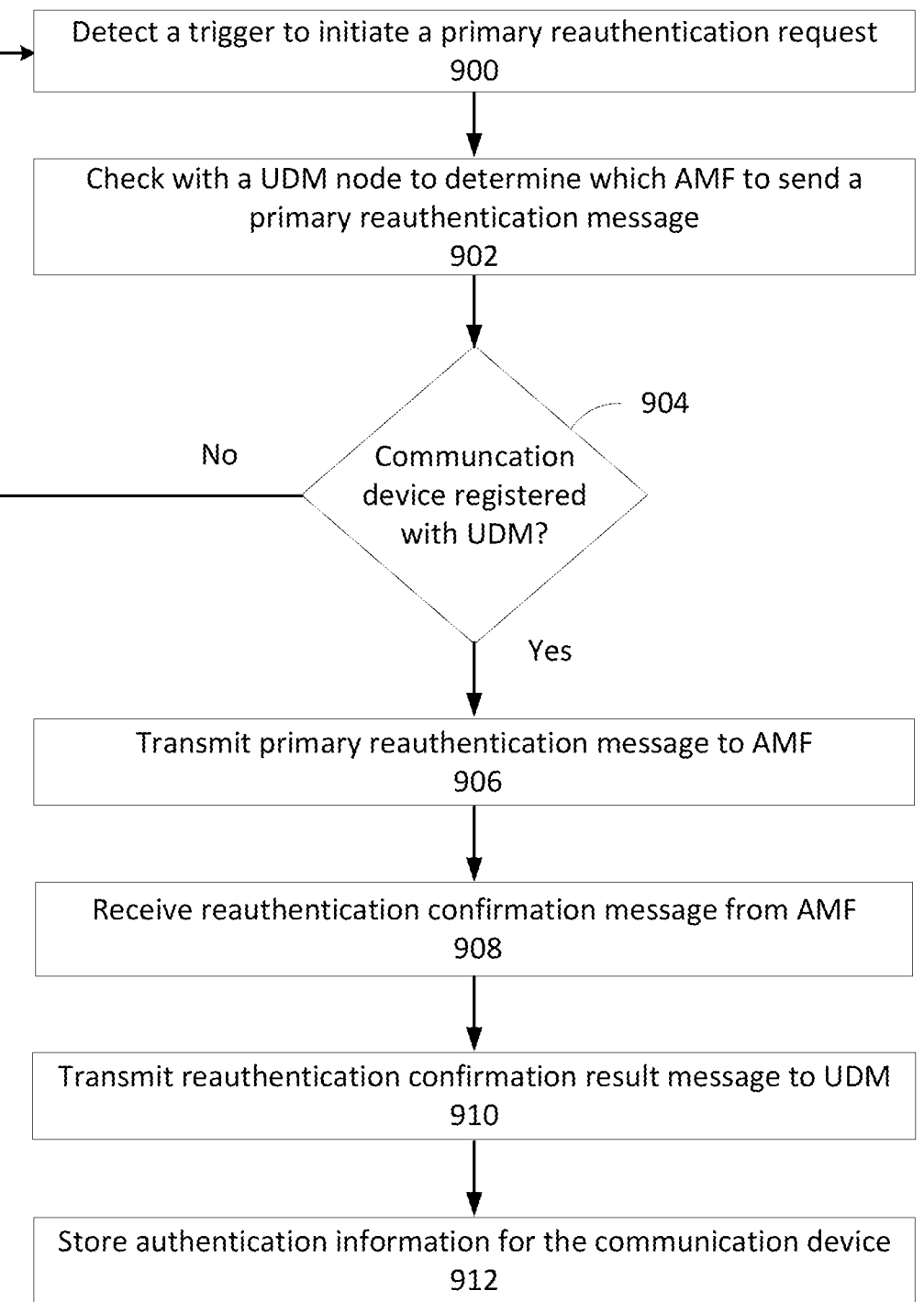
FIG. 9 is a flow chart illustrating operations of an AUSF node according to some embodiments of inventive concepts.

Various operations from the flow chart of FIG. 9 may be optional with respect to some embodiments of AUSF nodes and related methods. Regarding methods of claim 16, for example, operations of blocks 904 and 912 of FIG. 9 may be optional.

Figure 10:
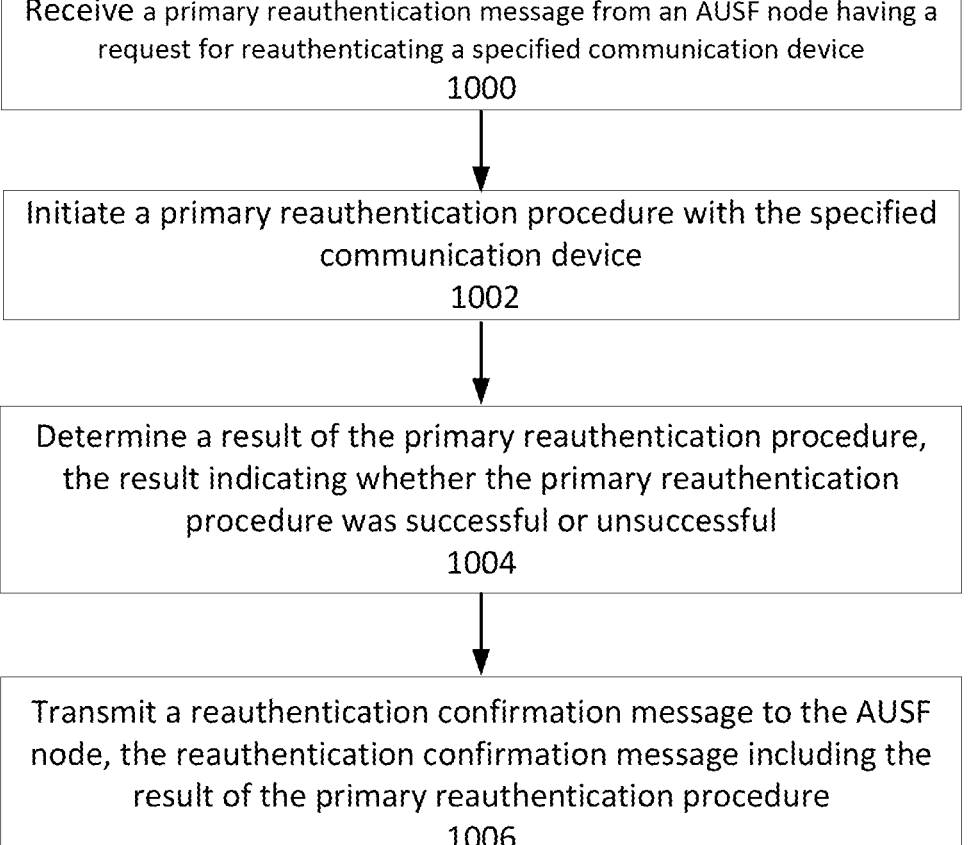
FIG. 10 is a is a flow chart illustrating operations of an AMF node according to some embodiments of inventive concepts.

Operations of an AMF node 500 (implemented using the structure of FIG. 5) will now be discussed with reference to the flow chart of FIG. 10 according to some embodiments of inventive concepts. For example, modules may be stored in memory 505 of FIG. 5, and these modules may provide instructions so that when the instructions of a module are executed by respective AMF node processing circuitry 503, processing circuitry 503 performs respective operations of the flow chart.

In block 1000, the processing circuitry 503 may receive a primary reauthentication message from an AUSF node having a request for reauthenticating a specified communication device. In receiving the primary reauthentication message from the AUSF node, the processing circuitry 503 may receive a primary reauthentication notification from the AUSF node. In another embodiment in receiving the primary reauthentication message from the AUSF node, the processing circuitry 503 may receive a primary reauthentication request message from the AUSF node.

In block 1002, the processing circuitry 503 may initiate a primary reauthentication procedure with the specified communication device.

In block 1004, the processing circuitry 503 may determine a result of the primary reauthentication procedure, the result indicating whether the primary reauthentication procedure was successful or unsuccessful. For example, if the communication device is not available (e.g., is turned off, in airplane mode, etc.), then the primary reauthentication procedure would not be successful.

In block 1006, the processing circuitry 1006 may transmit a reauthentication confirmation message to the AUSF node, the reauthentication confirmation message including the result (e.g., successful or unsuccessful) of the primary reauthentication procedure. In transmitting the reauthentication confirmation message to the AUSF node, the processing circuitry 503 may transmit a reauthentication confirmation notification to the AUSF node. In another embodiment, in transmitting the reauthentication confirmation message to the AUSF node, the processing circuitry 503 may transmit a reauthentication confirmation response message to the AUSF node.

Additional explanation is provided below:

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other features and advantages of the enclosed embodiments will be apparent from the following description.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

As used herein, network node refers to equipment capable, configured, arranged and/or operable to communicate directly or indirectly with a wireless communication device and/or with other network nodes or equipment in the communication network to enable and/or provide wireless access to the wireless communication device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Processing circuitry as used herein may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node components. For example, processing circuitry may execute instructions stored in a device readable medium or in memory within processing circuitry. Such functionality may include providing any of the various wireless features, functions, or benefits discussed herein. In some embodiments, processing circuitry may include a system on a chip (SOC).

A device readable medium may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. A device readable medium may store any suitable instructions, data or information, including a computer program, software, an application including one or more of logic, rules, code, tables, etc. and/or other instructions capable of being executed by processing circuitry and, utilized by a network node. A device readable medium may be used to store any calculations made by processing circuitry and/or any data received. In some embodiments, processing circuitry and device readable medium may be considered to be integrated.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality)

and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
UDM Unified Data Management
AUSF Authentication Server Function
HN Home Network
AMF Access and Mobility Management Function
SN Serving Network
UPU UE Parameter Update
SEAF Security Anchor Function
SUPI Subscription Permanent Identifier
AKMA authentication and key agreement for applications NEF network exposure function
HPLMN home public land mobile network
Nudm UECM UDM Service based interface UE Context Management

REFERENCES

[1] 3GPP TS 33.501, version 16.0.0
[2] 3GPP TS 29.503, version 16.1.0
[3] 3GPP TS 23.122, version 16.3.0
[4] 3GPP TS 23.502, version 16.2.0
[5] 3GPP TR 33.835, version 1.0.1

The invention claimed is:

1. A method performed by a processor in a unified data management, UDM, node of a communication network to initiate primary reauthentication of a communication device, the method comprising:

detecting a trigger to initiate a primary reauthentication request of the communication device;

checking an authentication status, stored in the UDM, of a Subscription Permanent Identifier, SUPI, of the communication device;

responsive to the authentication status of the SUPI being obsolete or null, transmitting a primary reauthentication message towards an Access and Mobility Management Function, AMF; and determining whether to continue, abort, or postpone any steering of roaming, SoR, updates, any user equipment parameter updates, UPUs, or any authentication and key agreement for applications, AKMA, procedures based on a reauthentication confirmation message.

2. The method of claim 1, wherein transmitting the primary reauthentication request comprises:

identifying an Access and Mobility Management Function, AMF, node registered in the UDM node via which the communication device registered to access the communication network; and including an identification of the AMF node in the reauthentication message.

3. The method of claim 1 wherein transmitting the primary reauthentication message towards the AMF comprises transmitting a reauthentication notification to an authentication server function, AUSF.

4. The method of claim 1 wherein transmitting the primary reauthentication message towards the AMF comprises transmitting a reauthentication request to an authentication server function, AUSF.

5. The method of claim 1 wherein transmitting the primary reauthentication message towards the AMF comprises responsive to a callback uniform resource identifier, URI, being provided by the AMF during AMF registration in the UDM, transmitting the primary reauthentication message to the AMF with the URI.

6. The method of claim 1 wherein receiving the reauthentication confirmation message comprises receiving a reauthentication notification.

7. The method of claim 1 wherein receiving the reauthentication confirmation message comprises receiving a reauthentication response message.

8. The method of claim 1 further comprising:

prior to detecting a trigger to initiate a primary reauthentication request of the communication device, storing the SUPI of the communication device.

9. The method of claim 8 further comprising:

storing at least one of an authentication result of the communication device, a timestamp of an authentication procedure of the communication device, and a serving network identifier of the communication device.

10. The method of claim 1 further comprising at least one of:

responsive to determining to continue any SoR updates, any UPUs, or any AKMA procedures, continuing a SoR update, a UPU, or a AKMA procedure;

responsive to determining to abort any SoR updates, any UPUs, or any AKMA procedures, aborting a SoR update, a UPU, or a AKMA procedure; and responsive to determining to postpone any SoR updates, any UPUs, or any AKMA procedures, postponing a SoR update, a UPU, or a AKMA procedure.

11. A method performed by a processor in an Access and Mobility Management Function, AMF, node of a communication network, the method comprising:

receiving a primary reauthentication message from a unified data management, UDM, node, the primary reauthentication message including a request for reauthenticating a specified communication device;

initiating a primary reauthentication procedure with the specified communication device;

determining a result of the primary reauthentication procedure, the result indicating whether the primary reauthentication procedure was successful or unsuccessful; and transmitting a reauthentication confirmation message to an Authentication Server Function, AUSF, node, the reauthentication confirmation message including the result of the primary reauthentication procedure.

12. The method of claim 11 wherein receiving the primary reauthentication message from the UDM node comprises receiving a primary reauthentication notification from the UDM node.

13. The method of claim 11, wherein transmitting the reauthentication confirmation message to the UDM node comprises transmitting a reauthentication confirmation notification to the UDM node.

14. The method of claim 11, wherein transmitting the reauthentication confirmation message to the UDM node comprises transmitting a reauthentication confirmation response message to the UDM node.

15. The method of claim 11 wherein receiving the primary reauthentication message from the UDM node comprises receiving a primary authentication request from the AUSF node.

16. The method of claim 11 further comprising:

prior to initiating the primary reauthentication procedure with the specified communication device, paging the specified communication device.

17. An Access and Mobility Management Function, AMF, node comprising:

processing circuitry; and memory coupled with the processing circuitry, wherein the memory includes instructions that when executed by the processing circuitry causes the AMF node to perform operations comprising:

receiving a primary reauthentication message from a unified data management, UDM, node, the primary reauthentication message including a request for reauthenticating a specified communication device;

initiating a primary reauthentication procedure with the specified communication device;

determining a result of the primary reauthentication procedure, the result indicating whether the primary reauthentication procedure was successful or unsuccessful; and transmitting a reauthentication confirmation message to an Authentication Server Function, AUSF, node, the reauthentication confirmation message including the result of the primary reauthentication procedure.

18. The AMF node of claim 17, wherein receiving the primary reauthentication message from the UDM node comprises one of receiving a primary reauthentication notification from the UDM node or receiving a primary authentication request from the UDM node.

19. The AMF node of claim 17, wherein transmitting the reauthentication confirmation message to the UDM node comprises one of transmitting a reauthentication confirmation notification to the UDM node or transmitting a reauthentication confirmation response message to the UDM node.

20. The AMF node of claim 17, the operations further comprising:

prior to initiating the primary reauthentication procedure with the specified communication device, paging the specified communication device.

* * * * *